March 11, 1969 — A. T. C. BURROWS — 3,431,867
CONVEYOR
Filed March 20, 1967 — Sheet 1 of 6
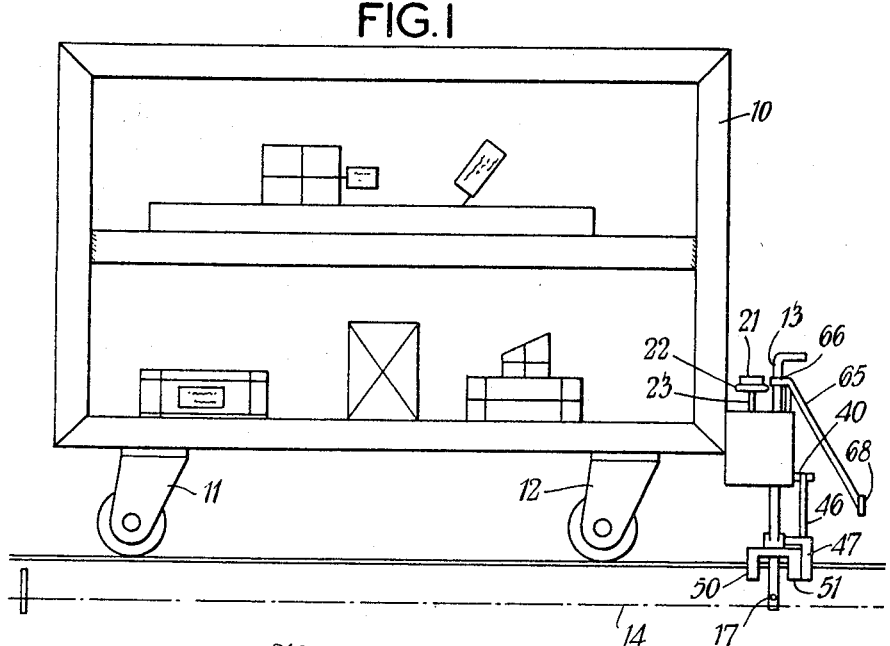
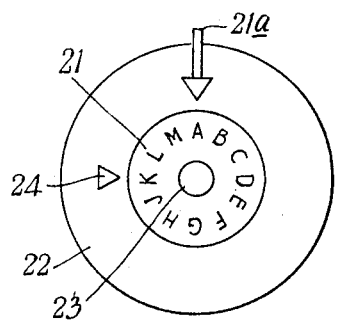
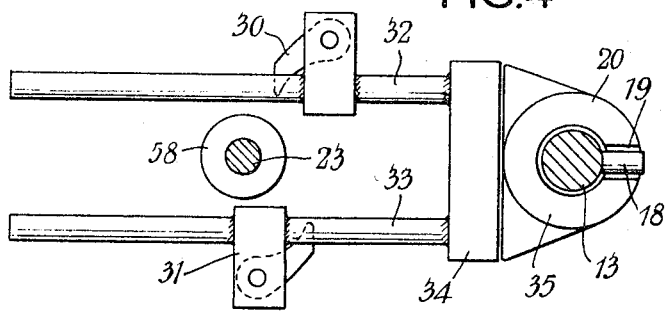
Inventor
Arthur Thomas Charles Burrows
By Cushman, Darby & Cushman
Attorneys March 11, 1969     A. T. C. BURROWS     3,431,867
CONVEYOR Filed March 20, 1967

Inventor
Arthur Thomas Charles Burrows
By Cushman, Darby & Cushman
Attorneys

March 11, 1969  A. T. C. BURROWS  3,431,867
CONVEYOR
Filed March 20, 1967  Sheet 6 of 6
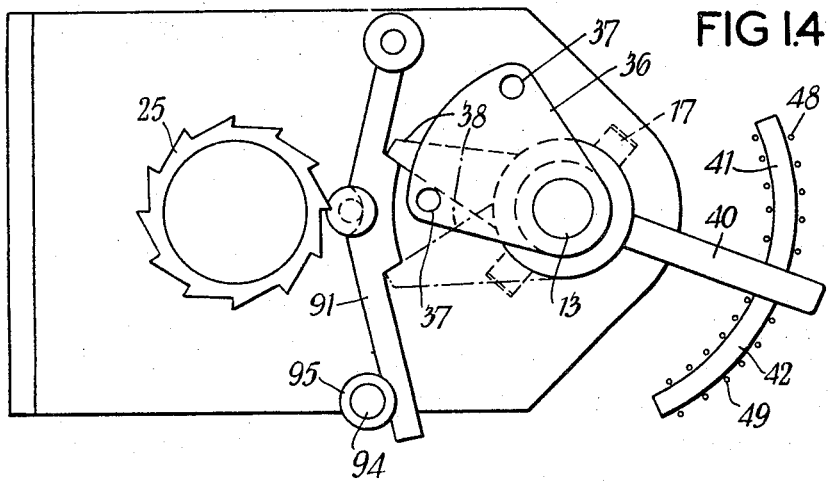
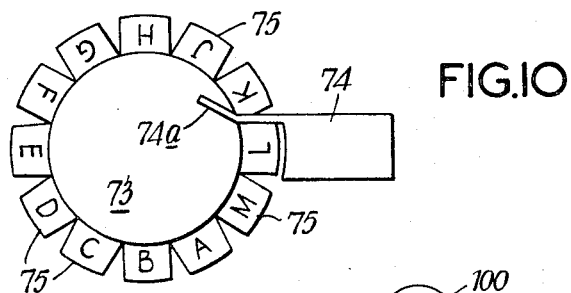
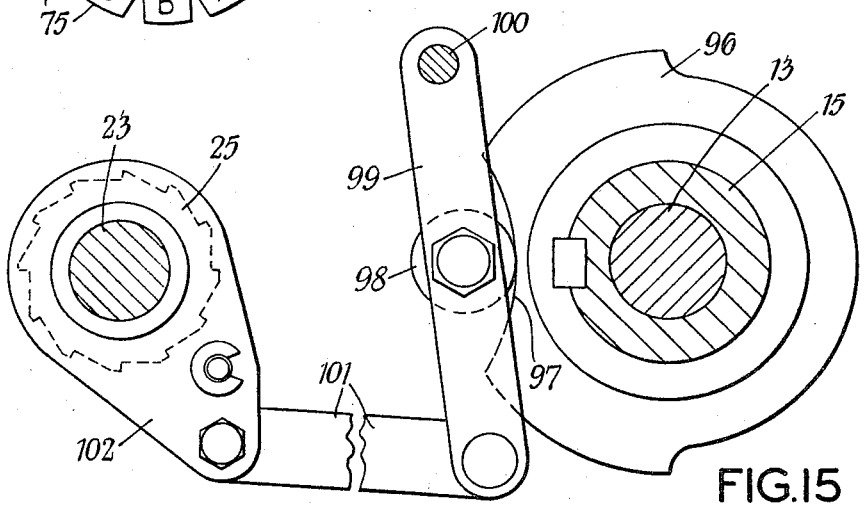
Inventor
Arthur Thomas Charles Burrows
By Cushman, Darby & Cushman
Attorneys

United States Patent Office 3,431,867
Patented Mar. 11, 1969

3,431,867
CONVEYOR
Arthur Thomas Charles Burrows, Hertfordshire, England, assignor to George W. King Limited, Stevenage, Hertfordshire, England, a British company
Filed Mar. 20, 1967, Ser. No. 624,340
Claims priority, application Great Britain, Mar. 23, 1966, 12,900/66
U.S. Cl. 104—172                      11 Claims
Int. Cl. B61b 9/00; B61j 3/04

ABSTRACT OF THE DISCLOSURE

In a floor conveyor of the kind wherein load carrying trolleys are towed or propelled over a floor by virtue of the engagement of a depending bolt or rod on each trolley with a driving abutment on an endless drive chain disposed below the floor in a trough or channel defining the conveyor path the provision of selector means on the trolleys whereby it will be possible to cause any trolley to be diverted automatically from the conveyor path to any preselected one of a number of branch lines leading from the latter. The selector means applied to a trolley include a selector disc capable of being set in a predetermined angular position to correspond to a selected branch line or alternatively a punched tape having one or more holes at predetermined points therealong to correspond to one or more selected branch lines, there also being a feeler element on the trolley adapted as the trolley moves along the conveyor and approaches each branch line to be actuated by a member adjacent the conveyor path, cam actuated ratchet means adapted on each actuation of the feeler element to impart a limited movement to the selector disc or tape as the case may be and means adapted when the disc or a hole in the tape is brought to a position corresponding to the selected branch line to effect setting of a guide member which will be effective to cause diversion of the trolley on to such branch line.

---

This invention relates to so-called floor conveyors of the kind wherein load carrying trolleys are towed or propelled over a floor or surface through the medium of an endless drive chain which is disposed below the floor or surface in a trough or channel in the latter, each trolley being provided with a depending bolt or rod like member which is adapted when in its operative position to project into the trough or channel in the floor or surface and to cooperate with one of a plurality of driving dogs or abutments spaced along the endless drive chain.

With such a conveyor it is possible to provide a layout wherein the trough or channel in which the drive chain is disposed, hereinafter termed the main path or track, is provided with a plurality of branches, hereinafter termed branch tracks or lines, which are spaced along the length thereof and lead off therefrom to a number of stations or storage areas sited at different points of the floor or surface. Given such a layout it is the chief object of the invention to provide selector means whereby it will be possible to cause any trolley moving along the main path or track to be diverted automatically to any preselected branch line or track.

According to the present invention in a floor conveyor of the kind specified and wherein the floor or surface is provided with a main path or track and a plurality of branch tracks or lines leading off therefrom at spaced points therealong it is proposed to provide a load carrying trolley with selector means through the medium of which automatic diversion of such trolley from the main path or track to any selected branch line or track may be effected such selector means comprising a movable destination selector element by means of which selection of a particular branch track or line may be effected, a feeler element adapted as the trolley moves along the main path or track and approaches each branch track or line to be actuated by a member disposed adjacent said main path or track, means adapted on each actuation of said feeler element to impart a limited movement to said destination selector element and means adapted when said element is brought to a position corresponding to the selected branch track or line to effect setting of a guide member which will be effective to cause diversion of the trolley on to such branch track or line.

Figure 2:
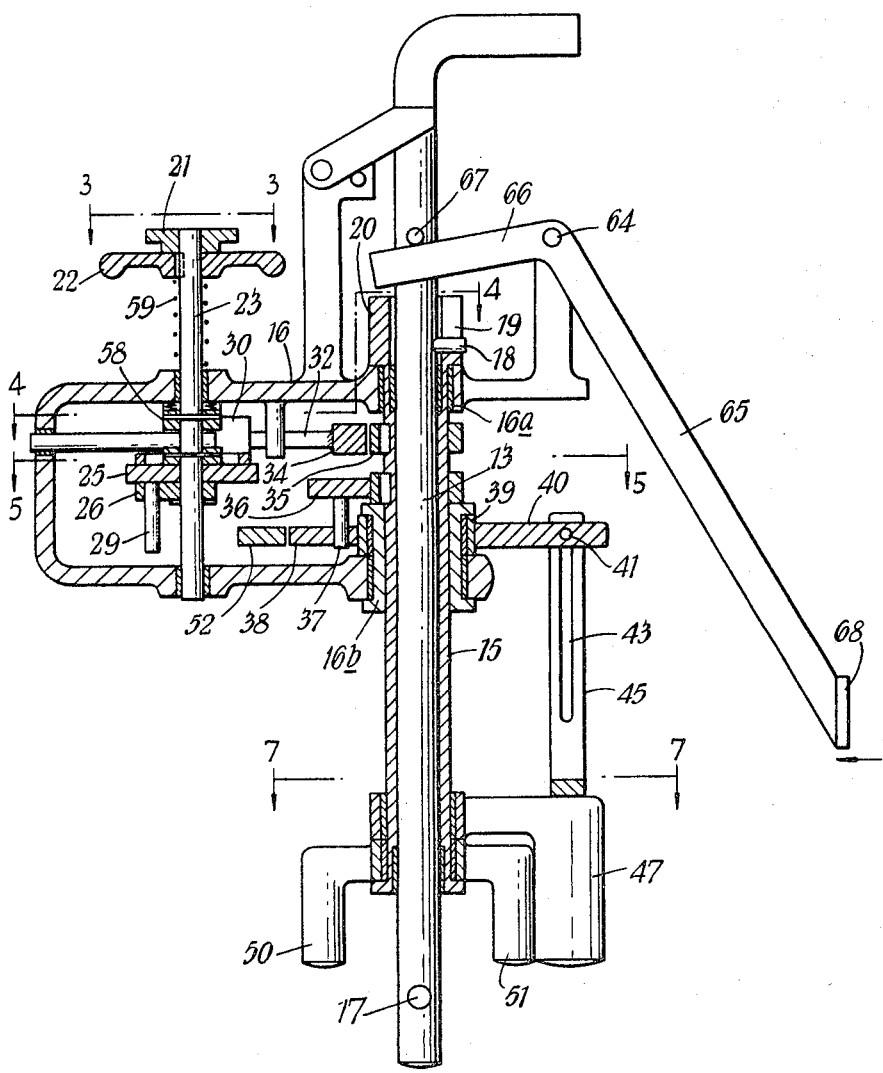
Figure 5:
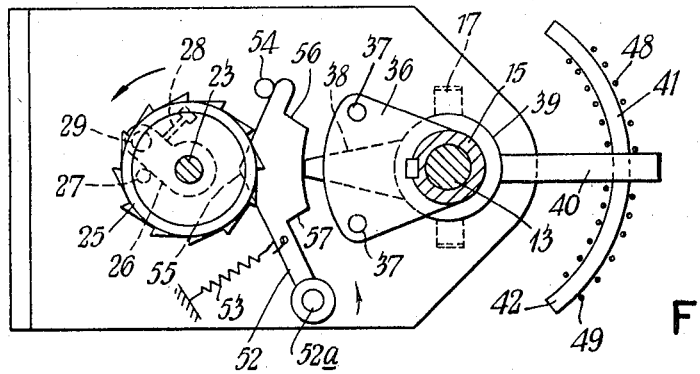
Figure 6:
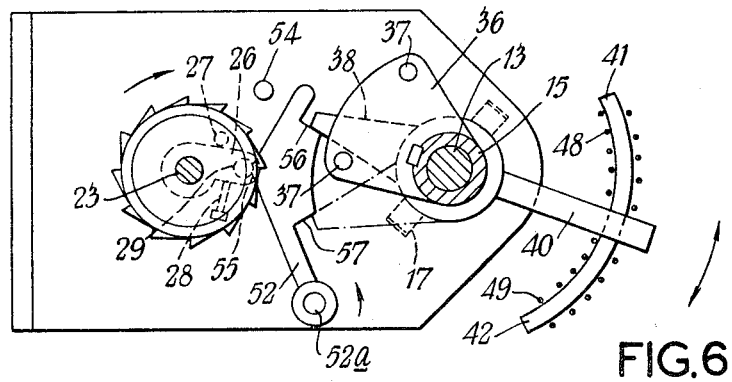
Figure 8:
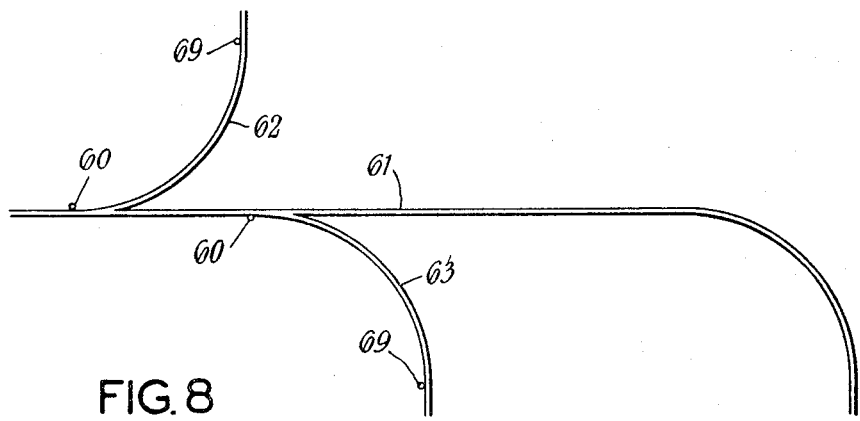
Figure 12:
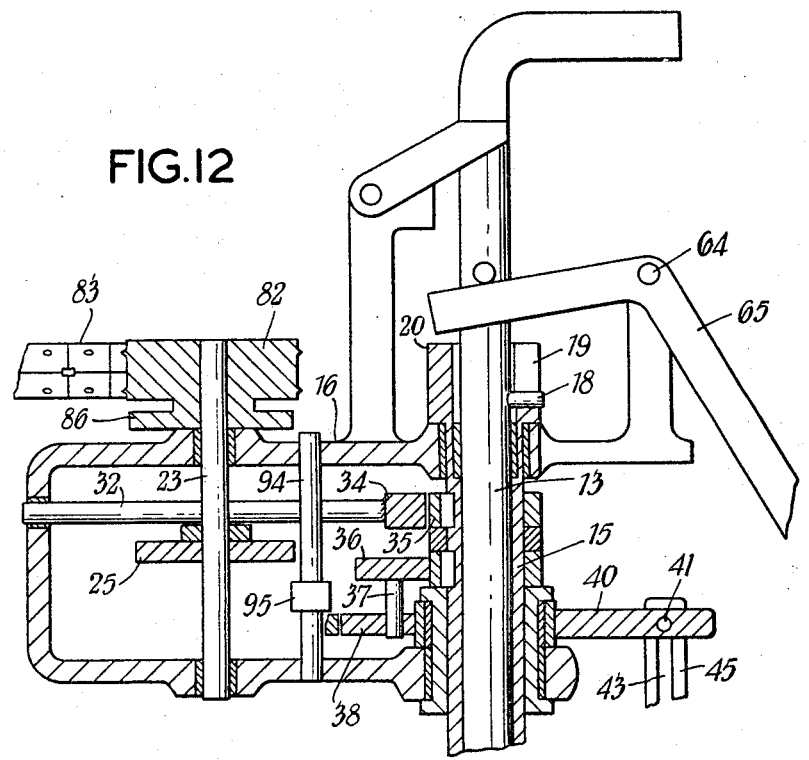
Figure 13:
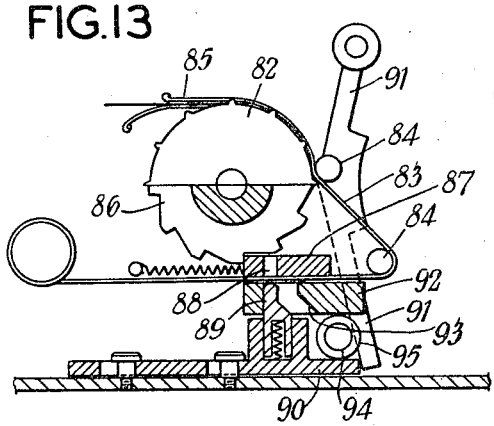
Figure 7:
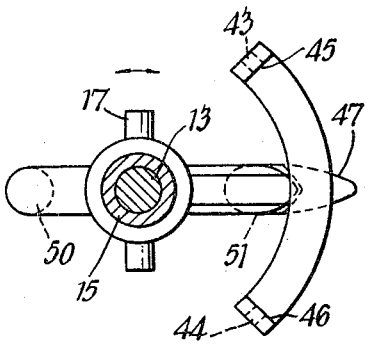
Figure 9:
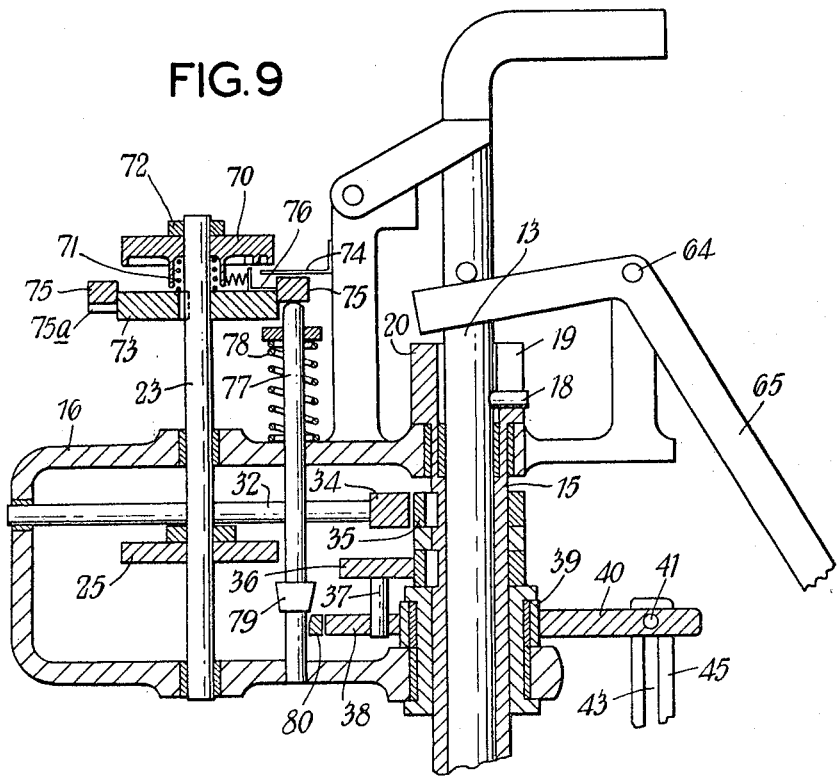
Figure 11:
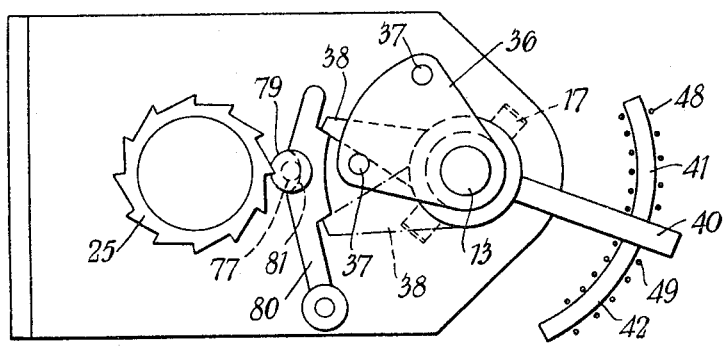

For a better understanding of the invention reference will now be made to the accompanying drawings which illustrate several possible constructional embodiments by way of example and in which:

FIGURE 1 illustrates a load carrying trolley fitted with a selector device in accordance with the invention, FIGURE 2 is a part sectional side elevational view of a selector on a larger scale, FIGURE 3 is a view on the line 3—3 of FIGURE 2, FIGURE 4 is a view on the line 4—4 of FIGURE 2, FIGURE 5 is a view on the line 5—5 of FIGURE 2, FIGURE 6 is a view similar to that of FIGURE 5 but showing the parts in an actuated condition, FIGURE 7 is a view on the line 7—7 of FIGURE 2, FIGURE 8 is a plan view of a part of a conveyor track layout, FIGURES 9, 10 and 11 illustrate a modified form of selector unit, FIGURES 12, 13 and 14 illustrate yet another possible form of selector unit, FIGURE 15 illustrates a possible modification of a part of the mechanism.

Referring now to the drawings and more particularly to FIGURE 1, 10 generally denotes a load carrying trolley which is supported on two sets of wheels or rollers 11, 12 so that it may readily be moved over a floor or surface. In the embodiment illustrated the rear wheels or rollers 11 are rotatable about fixed axes while the forward wheels or rollers 12 are of the swivelling or castor type. At its forward end the trolley is equipped with a depending bolt or rod 13 which is adapted, when in its operative position to depend into a trough or channel in the floor or surface and to cooperate with driving dogs or abutments carried by an endless driven chain which is disposed in the aforesaid trough or channel and is indicated in FIGURE 1 at 14. Conveyors of the kind so far described are generally well known and are referred to as floor type conveyors.

The present invention is concerned with floor type conveyors wherein the floor or surface over which load trolleys are required to be moved, is provided with a main conveyor track or path and also with a plurality of branch tracks which lead off from said main track so that trolleys may be conveyed to any one of a number of stations or storage areas sited at different parts of the floor or surface. With such an arrangement of tracks it is purposed to provide each trolley with a selector device which is capable of being set to ensure that the trolley will be diverted automatically from the main track into any preselected branch track.

Referring now to FIGURES 2–7 which illustrates a selector device it will be seen that the bolt or rod 13 which provides the coupling or drive connection between the trolley and the driving chain is supported for limited axial sliding movement in a bearing sleeve 15 which is in turn supported for rotary or angular movement about its longitudinal axis in appropriate bearings 16a, 16b carried by a casing or housing 16. The arrangement is such that the bolt or rod 13 may be raised from the operative or drive position shown in FIGURES 1 and 2, wherein it will cooperate with the driving dogs or abutments on the driving chain, to an inoperative position wherein the lower end thereof will be clear of said driving dogs or abutments and the drive connection will be broken or disconnected and vice versa. At its lower end the bolt or rod 13 is provided with a transverse peg 17 the purpose of which will be hereinafter made apparent. Towards its upper part said bolt or rod 13 is further provided with an outwardly directed pin 18 which is adapted to engage in an open topped slot 19 in a bush or collar 20 formed at the upper end of the bearing sleeve 15, the arrangement being such that while axial movement of the bolt or rod 13 relatively to the sleeve may take place any rotary or angular movement imparted to said bolt or rod will be transmitted to said sleeve 15 so long as the peg 18 is within said slot 19.

The actual selector mechanism will comprise a disc 21 which is marked with a plurality of indications each representing a particular branch track or station served by such track, there being a fixed pointer 21a cooperating with said disc. In the embodiment illustrated the several branch tracks are represented by the letters A, B, C . . . . 22 denotes a destination selector disc which is keyed on a shaft 23 and is coaxial with the disc 21, said disc 22 being provided with an arrow or pointer 24 which on rotation of the disc 22 may be brought opposite any selected one of the indications on the disc 21. The shaft 23, which is journalled for rotation in the casing or housing 16, has fixedly mounted thereon a ratchet wheel 25 and disposed below the latter, also on the shaft 23 is an arm 26 which is capable of angular movement with respect to the ratchet wheel about the axis of the shaft 23. The ratchet wheel is provided at its underside with a fixed stop 27 against which the arm 26 is resiliently pressed by means of a spring 28. As will be clearly seen from FIGURE 2 the arm 26 is provided with a depending peg 29 the purpose of which will be hereinafter made apparent.

Cooperating with the ratchet wheel 25 are two pawls 30, 31 which are carried by brackets mounted respectively on rods 32, 33 said rods, which are supported for axial sliding movement in the casing or housing 16 being carried by a transverse block or the like 34. Cooperating with the block 34 is an actuating cam 35 which is keyed to the bearing sleeve 15.

Also keyed to the bearing sleeve 15 is a sector shaped plate 36 carrying two depending pegs 37 adapted to cooperate with an arm 38 which is carried by a bush or collar 39, the latter being rotatably journalled on said bearing sleeve and carrying a second arm or extension 40 which is directed forwardly. The arm or extension 40 carries two arcuate guide rods 41, 42 the outer or free ends of which project through slots 43, 44 formed respectively in upwardly directed brackets 45, 46 carried by a guide member 47 which latter is rotatably journalled on the lower end of the bearing sleeve 15 and is adapted to depend into the trough or channel in the floor or surface. The arrangement is such that the guide member 47 will not depend into the trough or channel sufficiently to contact the dogs or driving abutments on the endless driven chain. 48 and 49 denote coil springs carried by the rods 41, 42 such springs being normally effective to centralise the arm or extension 40 and the guide member 47. 50, 51 denote additional guide pegs which are adapted to depend into the trough or channel but not however sufficiently to contact the driving dogs or abutments on the driving chain.

Also mounted in the casing or housing 16 for pivotal movement about a pin 52a is a latch element 52 which is normally urged by a spring such as is indicated at 53 into the position shown in FIGURE 5 wherein it will bear against a stop 54. The latch element 52 is formed with a nose or cam portion 55 with which the peg 29 on the arm 26 is adapted to cooperate when the ratchet wheel 25 is rotated to a predetermined position as will be hereinafter described. Said latch element 52 is also formed with retaining shoulders 56, 57 with one or other of which the arm 38 is adapted to cooperate on actuation of the latch element as hereinafter described.

In order to prevent undesirable rotary or angular movement of the shaft 23 and to ensure correct operation of the device friction pad means such as are indicated at 58 (FIGURES 2 and 4) will be provided and to ensure appropriate operation of such means said shaft is spring loaded as indicated at 59.

With load trolleys equipped with selector devices of the kind indicated above it is necessary to provide appropriate actuating means along the main conveyor path or track and to that end at a point preceding each junction of a branch track with said main conveyor path or track a fixed operating peg such as is indicated at 60 in FIGURE 8 will be provided. In FIGURE 8, 61 denotes the main conveyor path or track while 62, 63 denote branch tracks. It will be appreciated that the layout shown in FIGURE 8 is purely exemplary and that there may be any number of branch tracks from the main track depending upon the particular layout required.

It may be noted here that each trolley will also be provided with means which will be effective to cause automatic retraction or lifting of the bolt or rod 13 and discontinuance of the drive to the trolley in the event that there is any obstruction in its path. In the embodiment now illustrated such means comprise a lever which is pivotally mounted at 64 and one arm 65 of which is adapted to project downwardly and forwardly from the front of the trolley while the second arm 66 extends rearwardly and cooperates with a pin 67 on the bolt or rod 13. Mounted at the lower end of the arm 65 is a bumper plate or the like 68 of any convenient design. It will be appreciated that in the event of the bumper plate 68 contacting any obstruction in the path of travel of the trolley the lever will be rocked thereby to cause the arm 66 to lift the bolt or rod 13 upwardly and out of engagement with the driving chain.

The selector device described is adapted to operate as follows:

Assuming that it is desired to cause a trolley to be diverted from the main conveyor path or track and on to a particular branch line then the disc 21 is rotated until the letter indicated by the arrow 21a points to the letter corresponding to the station at which the trolley is then standing. With the disc 21 appropriately set, the destination selector disc 22 will then be moved angularly until the arrow or pointer 24 is brought opposite or into register with the particular indication on the disc 21 which corresponds to the selected branch track. This setting of the disc 22 will result in a corresponding setting of the ratchet wheel 25 and of the arm 26. The ability to set the disc 21 is necessary since load trolleys may be withdrawn from the tracks and re-engaged at any desired point and as a consequence the selector gear must be capable of being set at any position corresponding to the position of the trolley in the conveyor unit.

As the trolley moves along the main conveyor path or track and approaches the junction of each branch line the transverse peg 17 on the bolt or rod 13 will contact a fixed operating peg 60 with the result that due to forward travel of the trolley a limited angular or rotary motion will be imparted to said bolt or rod and thence via the pin 18 to the bearing sleeve 15. Angular movement of the sleeve 15 will cause a corresponding angular movement of the cam 35 with resultant axial displacement of the rods 32, 33 so that the pawls 30, 31 will be effective to impart a predetermined rotational movement to the ratchet wheel 25 to move the same by one tooth. It will be appreciated that such angular movement of the ratchet wheel will result in a corresponding movement of the arm 26.

The aforesaid angular movement of the bearing sleeve 15 will also simultaneously result in angular movement of the plate 36 with the result that one or other of the depending pegs 37, according to the direction of angular movement of the sleeve, will contact the arm 38 and impart a corresponding angular movement thereto and hence to the arm or extension 40 which will in turn result in compression of one or other of the springs 48, 49 with consequent urging of the guide member 47 in one direction or the other although the latter will be prevented from actually turning by reason of the fact that it is travelling in the trough or channel. The various movements above described will only be momentary as the bolt or rod 13 passes a fixed operating peg 60 and assuming that the latch element 52 is not actuated the various parts, apart of course from the ratchet wheel 25 and arm 26, will be almost immediately restored to their initial positions. The various movements or operations described will take place every time the trolley approaches a branch track. After a predetermined number of such actuations determined by the setting of the destination indicator disc 22 the ratchet wheel 25 and the arm 26 will be brought into a position such that the next actuation of said wheel will cause the peg 29 on the arm 26 to contact the latch element 52 and to move the same into its operative position (as illustrated in FIGURE 6) wherein it will effectively lock the arm 38 and hence the arm or extension 40 in the appropriate angularly displaced position so that when the guide member 47 reaches the track junction it wil be deflected by the appropriate spring 48 or 49 into the branch track thereby to cause diversion of the load trolley on to the branch line.

It will be appreciated that with the construction above described and illustrated the selector device will be actuated by fixed operating pegs disposed at either side of the main conveyor path or track.

At a selected point along each of the branch tracks or path a resetting peg such as is indicated at 69 (FIGURE 8) will preferable be provided such peg being adapted, as with the case of the pegs 60, to cooperate with the transverse peg 17 on the bolt or rod 13 thereby to cause further actuation of the ratchet wheels 25 and 26 such as will bring the peg 29 on the latter out of contact with the latch element 52 thereby to allow said latch element to return to its initial position under the action of its spring 53 and to free the arm 38 and the arm or extension 40 so that the parts will then re-assume their initial positions.

In FIGURES 9, 10 and 11, wherein the same reference numerals are employed to indicate those parts which are the same as those in the construction shown in FIGURES 2–7, a modified form of selector unit is shown. In this case a disc 70 is disposed on the shaft 23 carrying the ratchet wheel 25, such disc being spring loaded as indicated at 71 and retained in place on said shaft by means of a retaining element 72. The arrangement is such that on depression of said disc 70 against the action of its spring it will be possible to impart an angular or rotary movement to a destination selector disc 73 which similarly to the disc 22 of FIGURES 2–7 is keyed to the shaft 23 carrying the ratchet wheel 25. Fixedly mounted in position adjacent the disc 73 is a truck position indicator 74 which is provided with a finger or projection 74a. In this case the destination selector disc 73 is provided with a plurality of depressible keys or tabs 75 which which correspond to or represent the stations which may be selected. Cooperating with each key or tab 75 is a spring loaded retaining plunger 76. In the drawing only one such plunger 76 is shown but the arrangement is such that on depression of a key or tab 75 the plunger cooperating therewith will move under the action of its spring into a position wherein it will project across the top of such key or tab and thus positively lock the latter in its depressed position. As indicated at 75a on the left of FIGURE 9 the keys or tabs 75 are each chamfered at the underside to provide a ramp or cam surface the purpose of which will be hereinafter made apparent.

Supported within the casing or housing 16 for axial sliding movement is a plunger 77 with which any depressed key or tab 75 on the disc 73 is adapted to cooperate. The plunger 77 which is spring loaded upwardly by means of a spring 78 is provided with a cam 79 adapted to cooperate with a latch member 80 which corresponds to and performs precisely the same functions as the latch member 52 of the embodiment shown in FIGURES 2–7. In FIGURES 2–7 the latch member 52 is provided with a nose or cam portion 55 with which the depending peg 29 on the arm 26 is adapted to cooperate. In the present case, i.e. in the embodiment shown in FIGURES 9–11 the arm 26 and peg 29 are omitted and the latch member 80 is provided with a chamfered recess 81 with which the cam 79 on the plunger 77 is adapted to cooperate as will be hereinafter described.

Apart from the various items referred to above the rest of the mechanism will be precisely the same as that described with reference to FIGURES 2–7.

When a construction such as is illustrated in FIGURES 9–11 is employed the mode of operation will be as follows:

By depressing the disc 70 and appropriately rotating the same the destination selector disc 73 will be rotated until the key or tab 75 corresponding to the station at which the trolley is standing is brought opposite to the truck position indicator 74. Thereafter one or more of the tabs or keys 75 corresponding to the required station or stations at which the trolley is to be diverted is or are depressed. As indicated above on depression of a key or tab 75 its retaining plunger 76 will move into its operative position wherein it will positively lock such key or tab in its depressed position. At this stage the plunger 77 will be in its uppermost position as shown in FIGURE 9 so that the cam 79 will be clear of the latch member 80 which will thus be inoperative. The mechanism will function precisely as described with reference to FIGURES 2–7 i.e. each time the transverse peg 17 on the bolt or rod 13 contacts an operating peg adjacent the conveyor track the ratchet wheel 25 will be moved around by one tooth thereby moving the destination selector disc 73 angularly by a similar amount. The other parts of the mechanism i.e. the arm 38 and its associated parts will be actuated momentarily on each contact of the peg 17 with an operating peg precisely as hereinbefore described. After an appropriate number of such actuations the depressed key or tab 75 will be brought into a position wherein it will ride over the top of and depress the plunger 77. The movement of the key or tab over the top of the plunger 77 will be facilitated by reason of the chamfering 75a at the underside of the key or tab. On depression of the plunger 77 the cam 79 will cooperate with the chamfered recess 81 of the latch member 80 thereby to move the latter into an operative or locking position wherein as described with reference to the latch member 52 of FIGURES 2–7 it will serve to lock the arm 38 with corresponding results.

If after diversion of a trolley to a selected station it is again returned to the main conveyor line it may, if another key or tab 75 was initially depressed, be caused to travel to another selected station corresponding to said other depressed key or tab. The key or tab of the first selected station will be automatically reset to its initial or inoperative position by reason of the fact that as the trolley moves along the conveyor and the ratchet wheel 25 is actuated the finger or projection 74a on the truck position indicator 74 will be effective to cause retraction of the retaining plunger 76 thereby allowing return of the hitherto depressed key or tab to its initial position.

In the event of an incorrect setting of the keys or tabs on the disc 73 any such incorrectly actuated key or tab 75 may be returned to its initial position merely by depressing the disc 70 and rotating it together with the disc 73 through one complete revolution. It will be appreciated that during such rotation the finger or projection 74a or the truck position indicator will effect retraction of the retaining plunger or plungers 76 and hence allow return to the initial position of the keys or tabs 75.

An arrangement such as is illustrated in FIGURES 9–11 will have certain advantages over that shown in FIGURES 2–7 among which will be reduced operational error and the fact that centralised trolley programming will be possible.

In FIGURES 12–14 yet another form of selector unit is illustrated. As in the case of the modification shown in FIGURES 9–11 apart from the selector unit the remainder of the mechanism is the same as and functions in precisely the same way as is described with reference to FIGURES 2–7. In the embodiment illustrated in FIGURES 12–14 selection is effected by means of a pre-punched tape i.e. a tape wherein holes corresponding to those stations at which the trolley is to call are pre-punched in the tape. As shown clearly in FIGURE 12 the shaft 23 which as in the preceding embodiments carries the ratchet wheel 25 has keyed or otherwise fixedly secured thereto a sprocket wheel 82 around which the pre-punched tape 83 passes, the arrangement being such that on rotary movement of the shaft 23 resultant upon actuation of the ratchet wheel as hereinbefore described the tape will be caused to move. Suitable guide means such as rollers 84 and fixed guides 85 will be provided for ensuring that the tape will be maintained appropriately in contact with the sprocket wheel.

At the underside of the sprocket wheel 82 and integral therewith or fixedly secured thereto is a ratchet disc 86 which is adapted to cooperate with a spring loaded slide member 87 having an aperture 88 therein. It will be apparent on reference to FIGURE 13 that on each angular movement of the sprocket wheel 82 and hence of the disc 86 the slide member 87 will be caused to travel forwardly a short distance with the tape each time the latter is moved. Furthermore slide member 87 will travel at the same speed as the tape. On each such actuation as the tooth on the ratchet disc 86 clears the rear end of the slide member 87 the latter will be returned to its initial position by its spring in readiness for another actuation. 89 denotes a spring loaded plunger which is adapted normally to press against the tape 83, said plunger 89 being carried by a sliding member 90 which is provided with a depending portion adapted to cooperate as hereinafter described with a latch member 91 which corresponds to the latch members 52, 80 of the preceding embodiments. 92 denotes a fixed plunger guide which is provided with a chamfered surface 93 the purpose of which will be hereinafter made apparent.

94 denotes a locking spindle which is supported for axial sliding movement in the casing or housing 16 and is provided with a bush or collar 95 which is adapted to cooperate with the latch member 91. In the position shown in FIGURE 14 the locking spindle 94 is shown in its inoperative position in which the latch member 91 will similarly be inoperative i.e, ineffective to lock the arm 38.

In operation the mechanism will operate precisely as hereinbefore described with respect to the preceding embodiments i.e. each time the peg 17 on the bolt or rod 13 contacts an operating peg adjacent the main conveyor track an angular motion will be imparted to the ratchet wheel 25 and a momentary actuation of the arm 38 and its associated parts will also result. Each angular movement of the ratchet wheel 25 and hence of the shaft 23 will result in a corresponding movement of the sprocket wheel 82 and thus of the tape 83. Provided that there is no hole in the tape 83 the plunger 89 and its associated sliding member 90 will remain in the inoperative positions shown in FIGURE 13 and the latch member 91 will continue to remain inoperative. When as a result of successive actuations of the ratchet wheel 25 the tape 83 is moved to bring a hole therein into register with the aperture 88 in the slide member 87 and also with the plunger 89 the latter will be caused by its spring to project through the hole on said tape and into said aperture 88 so that said plunger 89 and its associated sliding member 90 will be effectively coupled to the slide member 87 and will move forwardly together therewith. As a result of the forward movement of the sliding member 90 the depending portion thereof will contact the latch member 91 displacing the same sufficiently to allow the locking spindle 94 to drop downwardly so that the bush or collar 95 will effectively lock said latch member 91 in its operative position wherein it will be effective to lock the arm 38 thereby to ensure diversion of the trolley to its selected station. The locking spindle 94 may move solely under the action of gravity or it may be spring assisted.

As the plunger 89 moves in the guide 92 it will eventually contact the chamfered surface 93 and will as a result be retracted from the hole in the tape and the aperture 87 in the slide member 86. The plunger 89 and its associated sliding member 90 will then be returned to their initial position as shown in FIGURE 13 by means of a spring (not shown) so that the depending portion of said member 90 will then be clear of the latch member 91. After the trolley has been diverted the latch member 91 may be released and rendered inoperative merely by lifting the locking spindle 94 back to its initial position.

The pre-punched tape may be of paper or other similar material if the tape is only to be used for a few times but if repetitive programming is required a more durable material such as steel may be used. Cassette loading of the tape may also be provided for if desired. One advantage of the modification shown in FIGURES 12–14 resides in the fact that any number of stations may be selected.

Clearly apart from the various forms of selector unit the mechanism above described and illustrated may well be varied in many respects. For example, instead of the arrangement shown in FIGURES 2 and 4 for actuating the ratchet wheel 25 and the shaft 23, it may be desirable to employ a construction such as is shown in FIGURE 15. In place of the cam 35 a member such as indicated at 96, FIGURE 15, may be keyed to the bearing sleeve 15 such member having an arcuate cam surface 97 with which a follower 98 carried by a lever 99 is adapted to cooperate. The lever 99, which is pivoted at one end about a fixed pivot 100, is pivotally connected at its other end to a link 101 which is in turn pivotally connected to a member 102 carrying a pawl (not shown) which is adapted to cooperate with and to actuate the ratched wheel 25. It will be appreciated that with an arrangement such as is illustrated in FIGURE 15 angular movement in either direction of the bearing sleeve 15 and hence of the member 96 will result in the desired angular movement of the ratchet wheel 25 and hence of the shaft 23.

With a conveyor system as described above the branch lines may or may not be powered i.e. it is optional whether or not there is a driving chain in the trough or channel defining each branch line. In the event that the or any of the branch lines are powered the drives of the chain or chains thereof may be geared to the chain of the main line but more usually they will not and thus the drive speeds of the branch lines may differ from that of the main line and moreover the spacing of the driving dogs or abutments on the chains of the branch lines may differ from that of the dogs or abutments on the main drive chain. In such circumstances it is conceivable that the bolt or rod on a trolley may be jammed on being diverted from the main conveyor line and to avoid that contingency it will be necessary to provide for resilient mounting of the dogs or abutments on the chains of the branch lines or to take some other appropriate precautions.

In the case where the branch lines are not powered it may be feasible to arrange for any selected trolley to be pushed on to the selected branch line by a following trolley proceeding along the main line. In such a case it would be necessary to provide some device on the rear of the selected trolley capable of being set, possibly simultaneously with the selector device, to render the dog disengaging device on the following trolley inoperative.

It may be also mentioned here that it would be possible to arrange for trolleys to be set in one branch line, to be subsequently transferred to the main line and then diverted from the latter to a selected branch line without in any way changing the principle hereinbefore described. In such a case however all of the branch lines would require to be powered and provision would have to be made to avoid collision with any trolley approaching the main line and a trolley proceeding along the latter. To achieve that it would be necessary to incorporate some means to ensure that the driving rod or bolt of the trolley approaching the main line would be raised clear of the driving chain of the branch line until an appropriate gap or space becomes available on said main line to accommodate the waiting trolley.

With a system such as is described above there will be no movable guide means or selector devices in or on the floor or surface. All that is necessary is the provision of fixed pegs in the floor or surface since the actual station selector mechanism is carried by each trolley.

I claim:
1. In a floor conveyor of the type having load carrying trolleys, each having a depending bolt member adapted to engage and be driven by an abutment on an endless chain disposed below the floor level in a channel defining the conveyor path, a selector means for diverting the trolley from the conveyor path to any preselected one of a member of branch lines leading from the conveyor path comprising:
 a movable, destination selector element for effecting selection of a particular branch line;
 a feeler element adapted to engage and be actuated by a member disposed adjacent the conveyor path;
 a cam actuated ratchet means operatively connected with the selector element;
 means operatively connecting the feeler element with the ratchet means for effecting a stepped movement of the ratchet means upon each actuating movement of the feeler element;
 guide means mounted on the trolley for horizontal angular movement and depending into the conveyor channel and being guided thereby;
 an arm resiliently coupled to the guide means and operatively connected to the feeler element for angular displacement upon actuation of the feeler element; and
 a latch element operatively connected to the selector element and operatively associated with the arm, the latch element normally being held in an inoperative position so that after angular displacement the arm can be returned to its normal position, the latch element adapted to be moved into an operative position in engagement with the arm and to hold the arm in an angularly displaced position when the latch element is actuated by the ratchet means moving into an operative position with the selector element whereby the angularly displaced arm will resiliently bias the guide means in the direction of the angular displacement of the arm so that the guide means will be deflected into a branch line upon moving into alignment with the branch line.

2. Selector means as in claim 1 wherein the feeler element is mounted on the bolt and wherein the means connecting the feeler element with the ratchet means includes a sleeve member supported coaxially on the bolt member, the sleeve member being axially movable relative to the bolt member and rotatably keyed to the bolt member so that angular movement of the bolt is imparted to the sleeve, a cam carried by the sleeve member, and pawl means actuated by the cam and cooperatively with the ratchet means to effect movement of the ratchet means upon rotation of the sleeve.

3. Selector means as in claim 2 additionally comprising an arm cam mounted on the sleeve and adapted to engage the arm for angularly displacing the arm upon rotational displacement of the sleeve.

4. Selector means as in claim 1 in which the destination selector element comprises a first disc having an indicator thereon and to which the step by step movement is imparted as a result of actuation of the feeler element and a second disc which is coaxial with the first and angularly movable relatively thereto said second disc carrying a plurality of indications corresponding to the several branch lines and being adapted initially to be set in a predetermined angular position so that an indication thereon corresponding to the starting position of the trolley will be brought into register with a fixed indicator, the arrangement being such that with the second disc so set the first may thereafter be rotated to bring the indicator thereon into register with an indication on said second disc corresponding to the selected branch line whereafter when as a result of the step by step movement of the first disc the indicator thereon is brought into register with the fixed indicator setting of the guide member will result.

5. Selector means as in claim 1 in which the destination selector element comprises a disc to which the step by step movement is imparted as a result of actuation of the feeler element there being a plurality of depressible key elements spaced around the periphery of the disc each corresponding to a separate branch line and the arrangement being such that said disc may be initially set to bring the key corresponding to the starting position of the trolley into register with a fixed indicator whereafter the key corresponding to the branch line selected may be depressed, the setting of the guide member being effected when the depressed key is ultimately brought into register with the fixed indicator.

6. Selector means as in claim 5 in which means are provided for maintaining any key in its depressed condition and means are provided for effecting re-setting of any key after each completed operation of the selector means or if a wrong setting has been made.

7. Selector means as in claim 1 in which the destination selector element comprises a tape which has at least one hole therein at a selected point therealong to correspond to a selected branch line, said tape being caused to pass around a sprocket wheel to which the step by step movement is imparted as a result of successive actuations of the feeler element, there being means effective when the hole in the tape is brought to a predetermined position to effect setting of the guide member.

8. Selector means as in claim 1 in which the latch element is adapted to be moved into its operative position by a member associated with the ratchet wheel which is in turn associated with the destination selector element.

9. Selector means as in claim 1 in which the latch element is adapted to be moved into its operative position as a result of the displacement of a cam member resultant upon the destination selector means reaching the position corresponding to the selected branch line.

10. Selector means as in claim 1 in which the latch element is adapted to be moved into its operative position by a slidable member the movement of which is controlled by a punched tape constituting the destination selector element, the arrangement being such that when as a result of step by step movement of the tape a hole therein is brought to a predetermined position said member will be caused to move to effect actuation of the latch element.

11. Selector means as in claim 1 in which the latch element is adapted to be moved into its operative position by a slidable member which has a spring loaded plunger associated therewith adapted to bear against one face of a punched tape constituting the destination selector element, there being an apertured slide member which is disposed adjacent the opposite face of the tape and is adapted on each movement of the latter to move therewith through a limited distance and the arrangement being such that when a hole in the tape is brought opposite the plunger the latter will project through said hole and engage the aperture in the slide member so that on movement of the latter a corresponding movement will be imparted to the slidable member to effect movement of the latch element into its operative position.

References Cited
UNITED STATES PATENTS 2,909,128 10/1959 Keen _____ 104—88
2,936,719 5/1960 Rodd _____ 104—172

ARTHUR L. LA POINT, *Primary Examiner.*

D. F. WORTH III, *Assistant Examiner.*